United States Patent
Moore

(10) Patent No.: US 7,710,505 B2
(45) Date of Patent: May 4, 2010

(54) METHOD AND APPARATUS FOR REMOTE CONTROL OF AUDIO VISUAL SYSTEMS

(75) Inventor: Charles H. Moore, Sierra City, CA (US)

(73) Assignee: VNS Portfolio LLC, Cupertino, CA (US)

( * ) Notice: Subject to any disclaimer, the term of this patent is extended or adjusted under 35 U.S.C. 154(b) by 0 days.

(21) Appl. No.: 12/148,130

(22) Filed: Apr. 16, 2008

(65) Prior Publication Data
US 2009/0262255 A1    Oct. 22, 2009

(51) Int. Cl.
*H04N 5/44* (2006.01)
(52) U.S. Cl. .................. 348/734; 348/553; 348/731
(58) Field of Classification Search .......... 348/734, 348/731, 211, 114, 725, 733, 553; 725/37–61, 725/134; *H04N 5/44*
See application file for complete search history.

(56) References Cited

U.S. PATENT DOCUMENTS

| | | | |
|---|---|---|---|
| 5,751,373 A * | 5/1998 | Ohyama et al. ............... | 725/59 |
| 6,505,346 B2 * | 1/2003 | Saib et al. .................... | 725/38 |
| 6,519,011 B1 * | 2/2003 | Shendar ...................... | 348/731 |
| 6,985,188 B1 * | 1/2006 | Hurst, Jr. ..................... | 348/553 |
| 2001/0017672 A1 | 8/2001 | Verhaeghe | |
| 2007/0079330 A1 | 4/2007 | Ludvig et al. | |

FOREIGN PATENT DOCUMENTS

| JP | 2005-124104 | 5/2005 |
|---|---|---|
| KR | 10-2005/0073009 | 7/2005 |

OTHER PUBLICATIONS

PCT/US2009/002360, International Search Report and Written Opinion dated Dec. 7, 2009.

* cited by examiner

*Primary Examiner*—Trang U Tran
(74) *Attorney, Agent, or Firm*—Henneman & Associates, PLC; Larry E. Henneman, Jr.

(57) ABSTRACT

The invention provides a method for improving the functionality of the jump button associated with television, cable/satellite receiver, or any other multi-channel device controlling remote control. The apparatus provides a jump button with the ability to access a wide variety of channels in an intelligent manner. At present, the jump button has the functionality such that the jump to location associated with selecting the jump button is the previously viewed channel, regardless of how the current channel being viewed is selected. The invention disclosed herein is a method of performing jumps on a device like a remote control in a more useful manner.

23 Claims, 2 Drawing Sheets

METHOD AND APPARATUS FOR REMOTE CONTROL OF AUDIO VISUAL SYSTEMS

BACKGROUND OF THE INVENTION

1. Field of Invention

The present invention pertains to controlling electronic devices. With greater particularity, the invention pertains to remote control of audio/visual devices. With still greater particularity, the invention pertains to methods and apparatus for controlling the use of the jump button in remote controls for devices which select channels.

2. Description of the Background Art

A remote control is a piece of equipment used to issue commands from a distance, commonly to an electronic device like a television or stereo from herein referenced as audio/visual (AV) equipment. This device is not connected with a wire; instead it communicates "wirelessly" via infrared (IR) frequency, radio frequency, Bluetooth communications, or any other type of wireless communication method that is available. For simplicity, although the terms "remote" and "remote control" can potentially have different meanings, from this point on unless otherwise indicated their meaning shall be exactly the same. Prior to the invention of the remote control, the only way in which to control an electronic device was by utilizing the buttons physically attached to the electronic device. Some time later a "wired" remote control was invented that allowed communication with the electronic device from a distance while the remote control was still connected to the device via a lengthy wire. The present standard is a remote control which controls the electronic device from a distance without wires. It is without question that remote controls have revolutionized the popularity of almost every electronic device, including televisions, cell phones, and video game systems, as well as many others. Remote controls also make it possible to control very small electronic devices that would otherwise be impossible to control via physical buttons without the assistance of very tiny fingers or finger like computerized controls.

Nearly all new AV devices purchased today come as standard with a remote control. It is common in the typical home in the Unites States, from herein referenced as user, to find in the primary room for AV multiple AV devices. This means that there are at least three or four remote controls needed to control all the AV devices in the room. A universal remote, like the name implies, is a single remote that can control a plethora of AV devices. The way in which the remote control works is not as important as the fact that it reduces the number of remotes needed by the user to control all of their AV devices. Recently there have been two trends in the nature of universal remotes. The first and more popular trend, which is utilized by third party vendors, has been toward the use of liquid crystal display (LCD) touch/viewable screens to aide in the functionality of the remote by reducing the number of physical buttons. The second trend is for the original equipment manufacturer (OEM) to provide as standard equipment, especially with new televisions, a remote control that can be used to control multiple AV devices. However, the OEM's universal remote controls are often only programmed to control devices from the same manufacturer as the television, although other manufacturer's AV devices can be controlled in certain cases. This trend has been utilized by the OEM manufactures to counter the purchase of third party vendor remote controls. The importance of a universal remote in its approach to minimize the number of remote controls the user must account for has been the primary focus of the device with each new generation's development.

Almost all manufacturers of handheld electronic devices are trying to design as much technology into the smallest space possible. With each new generation each new gadget becomes smaller, yet it is packed with more features than ever before. The recent trend in remote control design has been no different than any other handheld electronic gadget. The trend in remote controls has been in an effort to reduce the clutter that is associated with utilizing multiple remotes to control multiple AV equipment. However, this minimization of the number of remotes to be utilized has in no way improved the functionality of the remote. Often these universal remotes are cluttered with more buttons than any single remote controlling an AV device, would be expected for a multi-device controlling remote control. Still most will agree that having one remote control for multiple AV devices, even if the remote contains more buttons, is better than having multiple remotes for the same multiple AV devices. The reason most will agree is that they would prefer to have all the buttons in one place rather than having to search multiple mediums for the correct button.

The three most common ways to change the channel being viewed on a television and/or cable/satellite box are by using the following remote control buttons; channel up or channel down (scrolling), the numeric keypad, and jump. It is important to note that these buttons may also be located on the device in which the remote control is controlling and therefore this description should not be limited to the functionality of the buttons available on the remote control. Additionally, it is possible, with certain equipment, to utilize an on-screen channel guide to change the channel being viewed. The on-screen channel guide has been developed with the intention of giving the user the ability to view the large selection of programming available at a single glance while it is the opinion of the author that this menu does not give any functionality differences than scrolling or using the numeric keypad to change the channel being viewed. Typically, the on-screen menu only offers blocks of channels, and more specifically only one channel can be viewed at a time. The blocks consist of a number of channels, an index on one channel apart. In this situation, a user can only view a few channels at a time with the on-screen menu, and due to the nature of programming placement by the cable and satellite providers, these blocks offer very little improvement over simply scrolling through the channels to find the desired content. However, it is important to realize that channel selection via an on-screen channel guide is less common and more sophisticated than the primitive methods which will be discussed in further detail below. Additionally, utilizing some type of on-screen channel guide to switch channels can be viewed as an equivalent approach to channel switching via the numeric keypad and/or the scrolling buttons and therefore will not be discussed in any great detail regarding a channel changing option.

Consider a remote control with only two buttons for switching channels, the channel up button and the channel down button. These two distinct buttons will make up the totality of the scrolling buttons for channel changing. The description of functionality of the channel up button is best illustrated by a picture as shown in FIG. 1 (prior art). First, in FIG. 1 a remote control 1 is depicted with two buttons, the first being the 1/0 power button 2 and the second button being the channel up button 3. Remote 1 is controlling a TV or cable/satellite receiver with ten channels; we'll call them 0-9. The most common on-screen menus only allow one channel to be viewed, while the description of content being played on other nearby channels is also possible to be viewed. There are other on-screen menu types that allow multiple channels to be viewed at one time simultaneously, but they are not the standard.

Upon depressing power button 2 on remote 1, the remote itself is not powered on/off, instead the power for the TV or cable/satellite receiver (not shown) being controlled is powered on/off. Assume that by depressing power button 2 on the remote control this will now power on the device being controlled by remote control 1 and the channel being viewed is by default set to channel 0. If the user would like to view channel 1, the user would simply press channel up button 3 once. To view channel 2 when the current channel being viewed is channel 1, the user would press channel up button 3 once more. Similarly, to view the rest of the channels, 3-9, the channel up button would be depressed a certain number of times. Thus, it can be said that channel up button 3 has the functionality of always increasing the channel being viewed by an index of one. Once channel 9 is being viewed and channel up button 3 is selected, the next channel to be viewed is channel 0 not channel 10, as there is no channel 10.

Thus, it can be said that channel up button 3 will always increase the channel being viewed by an index of one, except in the case when the largest integer channel is being viewed, then channel up will change to the lowest integer channel available. Therefore, a remote control that only contains the channel changing button channel up allows the user to view all channels that are available, while it limits the mobility of channel selection to directional in the increasing positive whole number sense. The whole numbers are a super set of the natural numbers, as they include all natural numbers plus zero. The description of channel down is best illustrated by a picture as shown in FIG. 1. First, in FIG. 1 remote control 1 is depicted with two buttons, the first being the 1/0 power button 2 and the second button being the channel down button 4. The remote is controlling a TV or cable/satellite receiver with ten channels; we'll call them 0-9.

Upon depressing power button 2 on remote control 1 the remote itself is not powered on/off, instead the power for the TV or cable/satellite receiver being controlled is powered on/off. Assume that depressing power button 2 on remote 1 will now power on the device being controlled by the remote control and the channel being viewed is by default set to channel 0. If the user would like to view channel 1, the user must press down button 4 nine times and in this way the user will pass through channels 9-2. Likewise if a use wants to move from channel 1 to channel 2, the user will have to depress channel down button 4 nine times.

Channel down button 4 has a functionality of always decreasing the channel being viewed by an index of one, except in the case when the lowest integer value channel available is being viewed, then the channel down button has the affect of changing to the highest integer channel available. Just like a remote containing only a channel up button, a remote only containing a channel down button allows the user to view all channels that are available while it limits the mobility of channel selection to directional in the decreasing positive whole number sense. Most modern television and cable/satellite receiver remotes do not contain only one scrolling button; instead they contain both channel up button 3 and channel down button 4. This allows the user to view all channels that are available, but allows channel viewing in a bi-directional sense of either increasing or decreasing whole number valued channels.

Many modern remote controls also include a keypad 6 with ten numeric buttons. Such a remote control includes the ten numeric keypad buttons 0-9, the enter button 7, and 1/0 power button 2. Power button 2 does not power the remote; instead it powers the television or cable/satellite receiver that is being controlled. In the simplest example, the device that is being controlled has only ten channels available. For example, 0-9 and this implies a channel field width of one digit. Upon selecting power button 2 on the remote control, the channel being viewed is by default channel 0. To change to a different channel, for example channel 1, the user would select the button 1 on numeric keypad 6 followed by enter button 7. Changing to any of the ten channels is accomplished by selecting the desired channel to be viewed followed by enter button 7. This type of remote will allow the user one button access to all ten available channels. This is a very convenient feature of this type of remote.

The final feature of remotes to be discussed is one which contains a jump button 8 and also a 1/0 power button 2. The device that is being controlled by this remote, for simplicity, has only two channels; we'll call them channel 0 and channel 5. Like all other described remotes, power button 2 controls the 1/0 power for the device being controlled, not the power for remote control 1. Now, assuming power button 2 has been depressed and the device being controlled is powered on, by default the current channel being viewed is channel 0. Changing to the other viewable channel is only possible by selecting jump button 8. The way jump button 8 works is that upon powering on the device being controlled, channel 5 is stored as the jump to location when jump button 8 is selected. Selecting jump button 8 will change the channel being viewed from channel 0 to channel 5. At this point, when the current channel being viewed is channel 5, jump button 8 will store as its jump to location channel 0. Said another way, jump will always store as its jump to location the previously viewed channel. The only caveat to this definition, and which is only the case in this example shown in FIG. 1, is that upon powering on the device being controlled, by default jump button 8 stores as its jump to location channel 5. While not an option for the TV or cable/satellite receiver that is being controlled by the remote in FIG. 1, a remote control's jump button can actually jump the user to the exact same channel that is presently being viewed. This is possible if the current channel being viewed is still the same channel being viewed after some other single channel changing operation. A more general and correct definition of jump button 8 is that it always jumps to the location of the previously viewed channel. The only exception to this definition would be when the device has just been powered for the first time after production or a "hard reset" has occurred, as there may be no value set for jump or a default value has been set for this single occurrence. As a rule, jump always has a jump to location of the previously viewed channel. The foregoing are the three most common ways of performing channel changing; either by scrolling, numeric keypad selection, or jump. Almost every modern remote today contains the following buttons for channel changing: the numeric keypad 6 values 0-9, enter button 7, channel up 3, channel down 4, jump 8, and 1/0 power button 2 as shown in FIG. 1.

Additionally, shown in FIG. 1 is the channel that will be viewed when power button 2 is depressed on remote control 1, assuming this powers on the device being controlled, and this is the channel that was being viewed when the device being controlled by the remote was powered off. The three channel changing options described above give the user the ability to watch any channel available by depressing certain combinations of channel changing buttons. However the combination of buttons which will be selected greatly depends on the current channel being viewed and the channel which the user would like to view.

Remote control manufactures have heeded this criticism and have attempted to hide all these buttons by utilizing liquid crystal displays (LCD) and touch pad screens within the design of the remote. Regardless of whether the buttons are cluttered on one remote, are hidden by an LCD screen, or are spaced out on multiple remotes, one simple fact is true. An improvement in the functionality of one button on either the single device controlling remote or the universal remote will have a vast improvement on the usability of all remote controls that contain the button. This type of innovation, such as improving the functionality of a button on a remote control, has not been the focus of handheld; electronic device manufacturers, but would yield significant gains in the eyes of consumers.

SUMMARY OF THE INVENTION

The invention provides a method for improving the functionality of the jump button associated with television, cable/satellite receiver, or any other multi-channel device controlling remote control. The apparatus provides a jump button with the ability to access a wide variety of channels in an intelligent manner. At present, the jump button has the functionality such that the jump to location associated with selecting the jump button is the previously viewed channel, regardless of how the current channel being viewed is selected. The invention disclosed herein is a method of performing jumps on a device like a remote control in a more useful manner.

DETAILED DESCRIPTION OF THE FIGURES

Figure 1:
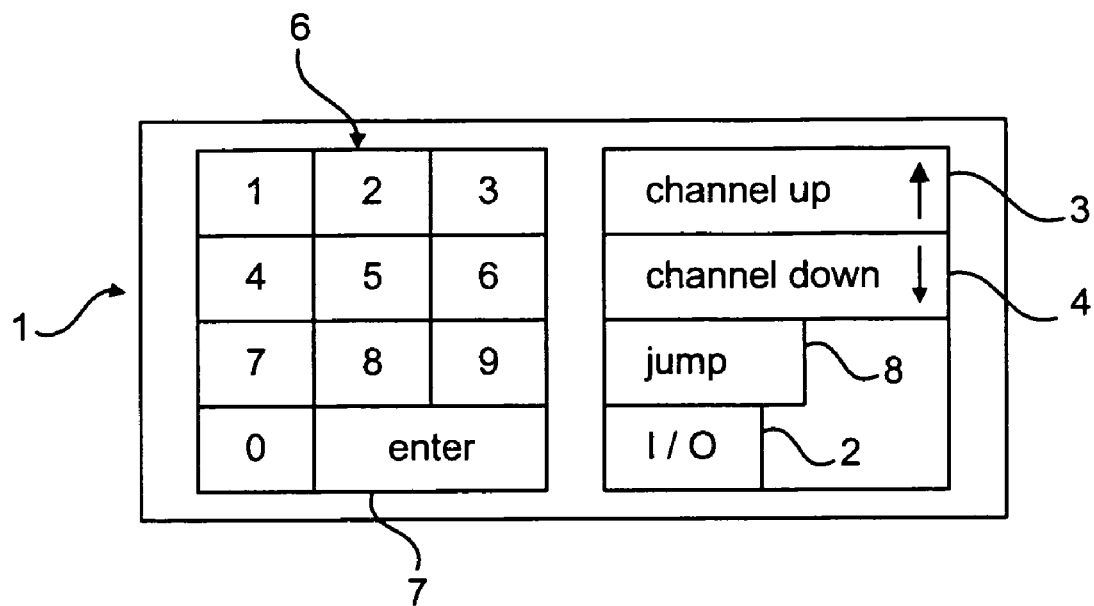
FIG. 1 is an illustration of a prior art remote control.

The present functionality of jump is to store as its jump to location the channel that was being previously viewed. The jump button will always take the user to the previously viewed channel, no matter how the user moved to the current channel. To best understand the inefficiencies of jump, an example is provided here. For the following example, assume for simplicity the user's cable or satellite provider has one hundred channels labeled 0-99. Additionally, the remote provided for the cable or satellite receiver has the following channel changing buttons: channel up, channel down, the numeric keypad (including the jump button), and jump. Also assume, for simplicity, that the channel field width is two digits (i.e., channel eight is 08 not 8). For this first example, the current channel being viewed is channel 45 and the channel the user would like to view is channel 46. The user is most likely to just press the channel up button once. However, there are certainly other options, including pressing the channel down button ninety-nine times, pressing the buttons 4, 6, and enter in series, if the previously viewed channel was 46 the user could simply press the jump button, or some other combination of the channel changing button operations that make the current channel being viewed channel 46. In this example, at the instant when channel 46 is viewed, the location of channel 45 is stored as the jump to location of the jump button.

The previously viewed channel is 45 when the channel up button is used to change channels or the jump button was used in which the previously viewed channel prior to the selection of the jump button was channel 46. While viewing the channel 45 and selecting channel down 99 times, the previously viewed channel is now 47.

Using some other combinations of buttons to view channel 46 from channel 45 will make the previously viewed channel whatever the previously viewed channel was in the context of getting to 46.

It is inconvenient for scrolling to change the alternate channel. The present invention avoids this. A simple programming of the jump command can avoid this problem. For example, the following commands in Forth will suffice. While the programming language Forth is used in this example, any programming language or even a hard wired logic circuit can achieve the same end. A remote control can be assembled from a microprocessor capable of handling Forth and this program. The following code can be used in such a remote control which contains a numeric keypad for channel selection as well as an 'enter', 'jump', 'up', and 'down' buttons utilizing the Forth programming language.

Forth Code
1 variable ch
2 variable alt
3: enter (n) ch @ alt ! ch ! (display);
4: jump alt @ enter;
5: up ch @ 1 + enter;
6: down ch @ −1 +enter;

The first line of code represents the creation of a variable 'ch' which stores the presently viewed channel. The second line of code shows the creation of a variable 'alt' which holds the previously viewed channel. The third line of Forth code describes a new Forth word enter:

3: enter (n) ch @ alt ! ch ! (display);

The Forth word enter expects a value to already be on the data stack. This would occur in the context of a remote as a user having pressed the channel which they would like to view. The overall functionality of the enter word is to take the channel which the user would like to view and make that the presently viewed channel. At the same time, the channel which the user was viewing prior to the entering of the channel the user would like to view is stored as the alternate channel. Shown next in Chart 1 are the stack effects associated with the word enter as well as the value held by each of the variables 'ch' and 'alt' when the word enter is executed.

CHART 1

| | ch | @ | alt | ! | ch | ! |
|---|---|---|---|---|---|---|
| | r2 | r2 | r2 | r2 | r2 | r2 | r2 |
| | r1 | r1 | r1 | r1 | r1 | r1 | r1 |
| | n | ch_address | ch | alt_address | n | ch_address | d2 |
| | d2 | n | n | ch | d2 | n | d3 |
| | d3 | d2 | d2 | n | d3 | d2 | |
| | | d3 | d3 | d2 | | d3 | |
| | | | | d3 | | | |
| | ch | ch | ch | ch | ch | ch | n |
| | alt | alt | alt | alt | ch | ch | ch |

The description of the stack effects begins with the bold faced letters r2 and r1 which represent the values contained within the top two most registers of the return stack and n, d2, and d3 which represent the values contained within the top three most registers of the data stack. The value n is simply the channel which the user would like to view and has entered via the numeric keypad on a remote. The Forth word enter is displayed again without the comments for simplicity:

3: enter ch @ alt ! ch !;

The definition of the Forth word enter comes immediately after enter in the form of seven other Forth words ch @ alt ! ch !, each having their own definition. Each of the five different Forth words as part of the definition of the Forth word enter will be described as part of the description of the Forth word enter in terms of the stack effects for those words. The word ch will place the address of the variable 'ch' and conceptually places that address ch_address into the top most register of the data stack. At the same time, all present values contained in the data stack are pushed into the next lowest register of the data stack. The return stack is unchanged, as well as the values held by the variables 'ch' and 'alt'. The next word as part of the definition of enter is the word @ which uses the address held in the top most register of the data stack and grabs the value pointed to by that address, which in this case is the ch value, and replaces the value in the top most register of the data stack. The next Forth word alt, similarly to word ch, places the address of alt alt_address onto the data stack and pushes each of the values contained in the data stack into the next lower register. The Forth word ! is the next word to define with the enter word, the variables alt and ch contain the same value being ch. Next, the ch word is executed again, which places the address ch_address onto the top of the data stack, pushing all other values in the data stack into the next lower register. The second to last word of the enter definition is the ! word, which uses the value in the top most register of the data stack as an address to place the second to the top value of the data stack. In this case, the value of n is placed into the ch variable while the alt variable is unchanged. Recall that n is the value which has been entered by the user as the channel which the user would like to view, and ch is the channel which the user was viewing prior to entering the channel n, which the user would like to view. Thus, the enter command has the effect of making n the current channel being viewed by storing n to the ch variable, as well as making the channel which the user was viewing ch and storing ch to the alt variable, thus making ch the channel which the user would go to if the jump (or last) button on the remote is selected.

The fourth line of Forth code describes the next Forth word jump, and is shown next along with the stack effects, in Chart 2 associated with executing the word jump:

4: jump alt @ enter;

CHART 2

|  |  |  |  | enter |  |  |  |  |
| --- | --- | --- | --- | --- | --- | --- | --- | --- |
| alt | @ | ch | @ | alt | ! | ch | ! |
| r2 | r2 | r2 | r2 | r2 | r2 | r2 | r2 | r2 |
| r1 | r1 | r1 | r1 | r1 | r1 | r1 | r1 | r1 |
| d1 | alt_address | alt | ch_address | ch | alt_address | alt | ch_address | d1 |
| d2 | d1 | d1 | alt | alt | ch | d1 | alt | d2 |
| d3 | d2 | d2 | d1 | d1 | alt | d2 | d1 | d3 |
|  | d3 | d3 | d2 | d2 | d1 | d3 | d2 |  |
|  |  |  | d3 | d3 | d2 |  | d3 |  |
|  |  |  |  |  | d3 |  |  |  |
| ch | ch | ch | ch | ch | ch | ch | ch | alt |
| alt | alt | alt | alt | alt | alt | ch | ch | ch | enter, and uses the two top most registers of the data stack. Notice that in the top two registers of the data stack just before the word ! would be executed are the address of the alt variable and the contents of the ch variable. The Forth word !, in this case, will use an address which is located in the top most register of the data stack and place the value which is located in the second to the top register of the data stack into the location pointed to by that address in the top most register of the data stack. After the execution of the word in conjunction, It is important to point out that the word jump does not require any values on the data stack to begin executing. The functionality of the word jump is to simply exchange the values of the alt and ch variables, making the channel held in the alt variable as the currently viewed channel.

The fifth line of Forth code describes the Forth word up and is shown next along with the stack effects illustrated in Chart 3 associated with executing the up word.

5: up ch @ 1 + enter;

CHART 3

|  |  |  |  |  | enter |  |  |  |  |  |
| --- | --- | --- | --- | --- | --- | --- | --- | --- | --- | --- |
| ch | @ | 1 | + | ch | @ | alt | ! | ch | ! |
| r2 | r2 | r2 | r2 | r2 | r2 | r2 | r2 | r2 | r2 | r2 |
| r1 | r1 | r1 | r1 | r1 | r1 | r1 | r1 | r1 | r1 | r1 |
| d1 | ch_address | ch | 1 | 1 + ch | ch_address | ch | alt_address | 1 + ch | ch_address | d1 |
| d2 | d1 | d1 | ch | d1 | 1 + ch | 1 + ch | ch | d1 | 1 + ch | d2 |
| d3 | d2 | d2 | d1 | d2 | d1 | d1 | 1 + ch | d2 | d1 | d3 |
|  | d3 | d3 | d2 | d3 | d2 | d2 | d1 | d3 | d2 |  |
|  |  |  | d3 |  | d3 | d3 | d2 |  | d3 |  |
|  |  |  |  |  |  |  | d3 |  |  |  |
| ch | ch | ch | ch | ch | ch | ch | ch | ch | ch | 1 + ch |
| alt | alt | alt | alt | alt | alt | alt | alt | ch | ch | ch |

The up word simply replaces the presently viewed channel with the channel which is one greater than the present channel being viewed. Additionally, the alt variable is replaced with the presently viewed channel ch.

The sixth line of Forth code describes the Forth word down and is shown next, along with the stack effects illustrated in Chart 4 associated with executing the down word.

6: down ch @ −1 + enter;

CHART 4

| | | | | | enter | | | | | |
|---|---|---|---|---|---|---|---|---|---|---|
| | ch | @ | −1 | + | ch | @ | alt | ! | ch | ! |
| r2 | r2 | r2 | r2 | r2 | r2 | r2 | r2 | r2 | r2 | r2 |
| r1 | r1 | r1 | r1 | r1 | r1 | r1 | r1 | r1 | r1 | r1 |
| d1 | ch_address | ch | −1 | −1 + ch | ch_address | ch | alt_address | −1 + ch | ch_address | d1 |
| d2 | d1 | d1 | ch | d1 | −1 + ch | −1 + ch | ch | d1 | −1 + ch | d2 |
| d3 | d2 | d2 | d1 | d2 | d1 | d1 | −1 + ch | d2 | d1 | d3 |
| | d3 | d3 | d2 | d3 | d2 | d2 | d1 | d3 | d2 | |
| | | | d3 | | d3 | d3 | d2 | | d3 | |
| | | | | | | | d3 | | | |
| ch | ch | ch | ch | ch | ch | ch | ch | ch | ch | −1 + ch |
| alt | alt | alt | alt | alt | alt | alt | alt | ch | ch | ch |

The down word simply replaces the presently viewed channel with the channel which is one less than the present channel being viewed. Additionally, the alt variable is replaced with the presently viewed channel ch.

Through the discussion of the first six lines of Forth code it is evident that regardless of how the channel is changed the currently viewed channel is saved into variable alt and the new channel is saved in variable ch, and then displayed. Thus, regardless of how the new channel is determined, the variable or word alt always stores the previously viewed channel.

The following two lines of Forth code will replace the existing last two lines of Forth code to improve the functionality of a remote control.

5a: up ch @ 1 + ch ! (display);
6a: down ch @ −1 +ch ! (display);

It is inconvenient for scrolling to change the alternate channel. The present invention avoids this. In the simplest description, the invention is the fact that scrolling (channel up and channel down) should never change the alt variable.

Line 5a redefines the up word in such a way that only the value held in the ch variable is modified. The following is a simplified (without comments) version of line 5a along with the stack effects illustrated in Chart 5 associated with executing the up word.

5a: up ch @ 1 + ch !;

CHART 5

| | ch | @ | 1 | + | ch | ! |
|---|---|---|---|---|---|---|
| r2 | r2 | r2 | r2 | r2 | r2 | r2 |
| r1 | r1 | r1 | r1 | r1 | r1 | r1 |
| d1 | ch_address | ch | 1 | 1 + ch | ch_address | d1 |
| d2 | d1 | d1 | ch | d1 | 1 + ch | d2 |
| d3 | d2 | d2 | d1 | d2 | d1 | d3 |
| | d3 | d3 | d2 | d3 | d2 | |
| | | | d3 | | d3 | |
| ch | ch | ch | ch | ch | ch | 1 + ch |
| alt | alt | alt | alt | alt | alt | alt |

Line 6a redefines the down word in such a way that only the value held in the ch variable is modified: The following is a simplified (without comments) version of line 6a along with the stack effects in Chart 6 associated with executing the up word.

6a: down ch @ −1 + ch !;

CHART 6

| | ch | @ | −1 | + | ch | ! |
|---|---|---|---|---|---|---|
| r2 | r2 | r2 | r2 | r2 | r2 | r2 |
| r1 | r1 | r1 | r1 | r1 | r1 | r1 |
| d1 | ch_address | ch | −1 | −1 + ch | ch_address | d1 |
| d2 | d1 | d1 | ch | d1 | −1 + ch | d2 |
| d3 | d2 | d2 | d1 | d2 | d1 | d3 |
| | d3 | d3 | d2 | d3 | d2 | |
| | | | d3 | | d3 | |
| ch | ch | ch | ch | ch | ch | −1 + ch |
| alt | alt | alt | alt | alt | alt | alt |

Thus, from the present channel, 3 channels are available with 1 button: up down jump. Jump always goes to the alternate channel, even if preceded by up or down. Prior art would reset the alternate channel on up, so that jump would act like down. This reduces the easily selected channels to 2. This invention allows one to scroll in a region about the present channel or jump to an alternate region and scroll there. It provides 2 distinct regions to scroll within.

Thus far, the method of redefining the functionality of the jump button has been restricted to examples when the jump to location of the jump button should not be changed. It has been said that the jump button will not necessarily contain the jump to location of the previously viewed channel. The jump button would only make sense to change its jump to location when the two channels the user would like to jump between are an index of at least two apart (there should be at least one channel being jumped). This method of defining the jump implies that the location being jumped to is not as important as the region in which the location is being jumped. More generally, the jump button should have the functionality of jumping between regions, not locations. The definition of a location is a channel. The definition of a region is not so clear, yet the jump to place within the region is a location. This kind of jump will be referenced herein as new-jump for simplicity, and will allow the reader to differentiate the existing jump from the present inventive new-jump.

Figure 2:
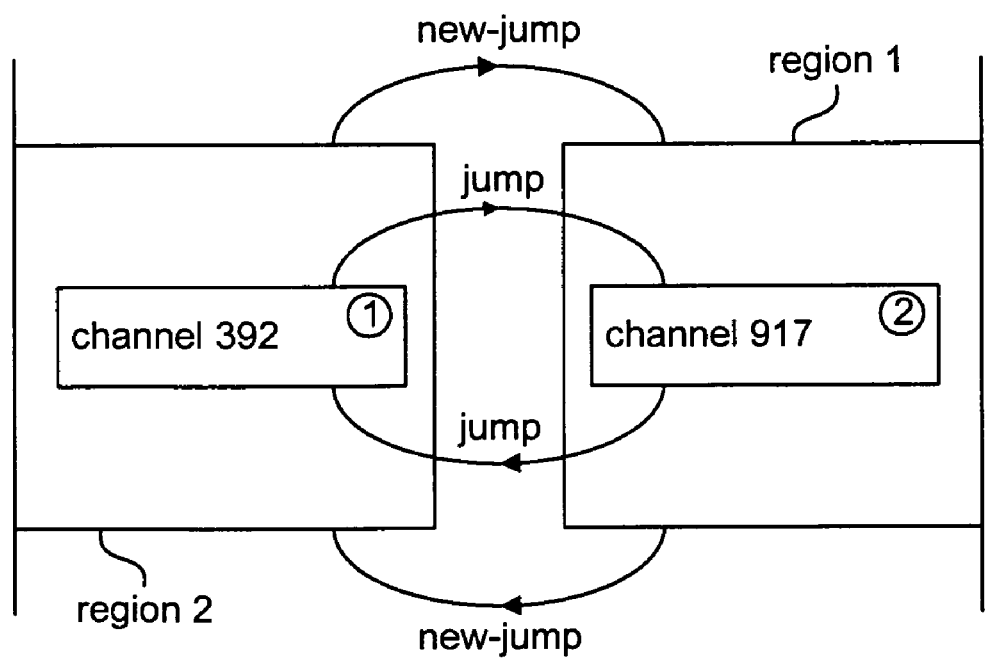
FIG. 2 illustrates the operation of the invention in a simple situation.

FIG. 2 is an example where two regions are defined to move between. Assume that the user has one thousand channels available 0-999. The user has two preferred channels to view; we'll call them channel 392 and channel 917. The current channel being viewed is 392. Due to the fact that commercials occur very often on this channel, the user switches to channel 917. The current channel being viewed is channel 917 and this channel also currently has a commercial being played. This example has been illustrated in the following figure with the jump to location and new-jump jump to locations within the regions shown.

In this situation, the prior functionality of the jump button would be to have channel 392 as a jump to location. Once channel 392 is the current channel being viewed, the jump to location of the jump button takes the user back to channel 917. The functionality of the inventions jump would be no different than the prior functionality of the existing jump in this particular case. Illustrated in FIG. 2 are the new-jump, jump to regions: region 1 and region 2. Region 1 contains the location of channel 917. Region 2 contains the location of channel 392. In this particular example, the new-jump jump to location can be exactly defined. This is only true for the reason that, as was indicated above, the user has a preference for these two channels. This preference can be defined more rigorously given other non-specified parameter(s). If new-jump is selected when the current channel being viewed is channel 917, the exact new-jump jump to location is channel 392. Additionally in this example, if the new-jump button is selected when the current channel being viewed is channel 392, the new-jump jump to location is channel 917. This is again taking into account the preference of the user and other parameter(s) which have yet to be defined.

Figure 3:
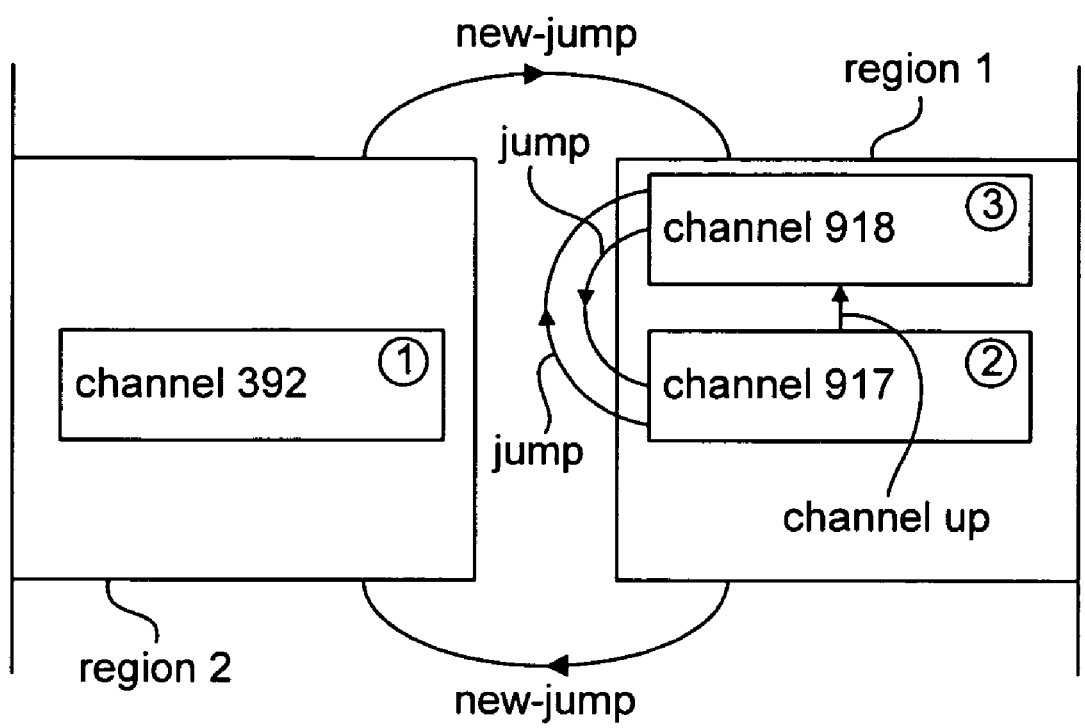
FIG. 3 illustrates the operation of the invention in a second situation.

In FIG. 3, the current channel being viewed is channel 392 where, again, a commercial is playing. Due to the fact that commercials occur very often on this channel, the user switches to channel 917. The current channel now being viewed is channel 917, and this channel also has a commercial being played. Instead of going back to channel 392, the user decides to browse by pressing the channel up button once so that the current channel being viewed is channel 918.

After watching this channel (channel 918) for a few minutes, the user realizes that the commercials must be finished on channel 392, so the user would like to switch back to said channel. Given the present functionality of the jump button, the user would only be able to jump to channel 917. On the other hand, the new-jump jump button will have the functionality of moving the user between region 1 and region 2. More specifically in this example, by selecting the new-jump button after the series of channel changes previously described, the jump to location of the new-jump button will be channel 392. This is again based on the preferences of the user, and more specifically those parameter(s) which have yet to be formally defined. Once the presently viewed channel via selecting new-jump is channel 392, which channel will be the current channel being viewed by selecting new-jump again? This is an interesting question, with a not so obvious answer. It is clear that the region that will be jumped to will be region 1, but what is not so clear is whether the jump to location of new-jump will be to channel 917 or 918. This would again be based on the preferences of the user and other parameter(s) which have not been formally defined. Carrying this example a little further, what if the user is watching channel 392, switches to channel 917 and then presses the channel up button twice so that the current channel being viewed is channel 919? Should the new-jump button now have a jump to location of channel 917 or 392? This question raises the problem of how and when a region should be changed. At present, in FIG. 3 there are two regions, region one simply containing channel 392, and region two containing channels 917, 918, and presumably channel 919. However, this presumption may not be accurate, and pressing the channel up button twice from channel 917 could actually change the regions in which the new-jump will move between. Clearly, the idea of how and when a region changes is an extremely important aspect of this invention, yet the rules defining how and when a region will change are difficult to pinpoint. For this reason, the idea of dynamically changing regions and the location within a region where the new-jump jump button will jump to can be performed with many possible variants, such as including input selection along with channel jump.

The value stored in the jump to location does not depend on the content of the channel actually being decoded and on the screen. For example, if you scroll from HD to SD channels, the HD channels take longer to decode than the SD channels. This is the case when you are changing channels and something takes too long to become viewable and you simply move on to the next channel. It is necessary to make a distinction between previously viewed in the sense of actually watching content (decoded) and the fact that a channel can be the previously viewed channel without viewing content (not leaving enough time for decode). This is an inefficient use of the jump button, because the location that is being jumped to is only an index of one away. The jump button now contains the same functionality as the channel down button. Due to the fact that the current channel being viewed is channel 46, what happens if the user presses the channel down button so that the new current channel being viewed is channel 45? The jump button will now contain as its jump to location, channel 46. Again, this is an impractical functionality for the jump button, as it contains the same functionality as the channel up button. These two situations illustrate two common examples for which the jump button will have the identical functionality of two other buttons on the remote, namely channel up and channel down. Continuing with the previous example a little further, now what happens when the current channel being viewed is channel 45 and the user presses the buttons, 4, 6, and enter in series so that the new current channel being viewed is channel 46? Now the jump button has the jump to location of channel 45, which is inefficient for the reasons stated above. This type of channel changing is quite common, especially when the user does not realize the channel they are changing to is only an index of one channel away from the currently viewed channel. This is another example for which the functionality of the jump button is impractical as it is presently designed.

It would be easy, at this point, to believe that the jump button cannot contain a useful functionality for which the jump button has the same functionality as other channel changing buttons. However, the reality is that the jump button will always have the functionality of some combination of the channel changing buttons (either scrolling or the numeric keypad). The key to realizing an efficient use for the jump button is in determining how to associate a jump with the scrolling and the numeric keypad channel changing buttons, which are the two most common methods a user will utilize to change the channel. Clearly, the jump button should never be associated with a channel that is an index of one channel away. This implies that a jump will not have the same functionality of a channel up or channel down. Furthermore, if the numeric keypad is used to select a channel which is an index of one channel away from the current channel being viewed, the jump button should not take on this function either. These restrictions on when the jump to location should not be changed are the beginning of the redefinition of the jump button where a jump will no longer have to contain the jump to location of the previously viewed channel.

The foregoing description of embodiments of the present invention has been provided for the purposes of illustration and description. It is not intended to be exhaustive or to limit the invention to the precise forms disclosed. In the interest of clarity about the invention, the illustrations and textual description of the embodiments described herein contain a number of simplifications and omissions that will be recognized by those skilled in the art. Many modifications and variations will be apparent to those skilled in the art. These variations are intended to be included in aspects of the invention. In addition, various features and aspects of the above described invention may be used individually or in combination. The embodiments described herein were utilized to explain the principles of the invention and its application, thereby enabling others skilled in the art to understand the invention for various embodiments and with various modifications as are suited to the particular use contemplated.

INDUSTRIAL APPLICABILITY

The inventive method is intended to be widely used in a great variety of consumer electronic applications. It is expected that they will be particularly useful in applications where large numbers of channels and several types of electronic apparatus need remote control, and yet power consumption and heat production are important considerations.

Since the method of the present invention may be readily produced and integrated with existing tasks, input/output devices and the like, and since the advantages as described herein are provided, it is expected that they will be readily accepted in the industry. For these and other reasons, it is expected that the utility and industrial applicability of the invention will be both significant in scope and long lasting in duration.

I claim:

1. A remote control having a numeric keypad and channel up, channel down, enter, and jump functions for use with audio/video devices capable of receiving multiple channels, the improvement comprising:
    means for selecting a first channel within a continuum of selectable channels, said first channel being a presently-accessed channel;
    means for storing said first channel as a first jump location;
    means for selecting a second channel within said continuum of channels responsive to said enter function, said second channel becoming said presently-accessed channel;
    means, responsive to said enter function, for storing said first channel as a second jump location and for storing said second channel as said first jump location;
    means for scrolling from said second channel to other channels within said continuum of channels responsive to said channel up function and said channel down function to cause another channel to become the presently-accessed channel; and
    means, responsive to said jump function, for jumping between said first jump location and said second jump location, said means jumping to said second jump location regardless of the presently-accessed channel.

2. A remote control according to claim 1, wherein, responsive to said jump function, said first channel is stored as said first jump location and said second channel is stored as said second jump location.

3. A remote control according to claim 2, further comprising:
    means for selecting a third channel within said continuum of channels responsive to said enter function, said third channel becoming said presently-accessed channel; and
    wherein, responsive to said enter function, said first channel is stored as said second jump location and said third channel is stored as said first jump location.

4. A remote control according to claim 1, further comprising:
    means for defining a region of channels within said continuum of channels responsive to said second channel being selected, said region including a plurality of channels, said plurality of channels including said second channel; and
    means, responsive to scrolling to a third channel outside of said plurality of channels of said region using at least one of said channel up function and said channel down function, for storing said third channel as said first jump location and for storing said second channel as said second jump location.

5. A remote control according to claim 4, further comprising means for defining another region of channels within said continuum of channels responsive to said third channel being scrolled to, said another region including another plurality of channels, said another plurality of channels including said third channel.

6. A remote control according to claim 4, wherein said plurality of channels in said region of channels includes a predetermined number of consecutively-selectable channels.

7. A remote control according to claim 4, wherein said region includes at least one channel below and at least one channel above said second channel.

8. A method for selecting channels in a receiver capable of receiving multiple channels by remote control, said method comprising the steps of:
    providing a first channel within a continuum of selectable channels, said first channel being a presently-accessed channel;
    storing said first channel as a first jump location;
    selecting a second channel within said continuum of channels responsive to an enter function, said second channel becoming the presently-accessed channel;
    storing, responsive to said enter function, said first channel as a second jump location and said second channel as said first jump location;
    scrolling from said second channel to other channels within said continuum of channels responsive to at least one of a channel up function and a channel down function to cause another channel to become the presently-accessed channel; and
    responsive to a jump function, jumping between said first jump location and said second jump location regardless of the presently-accessed channel.

9. A method according to claim 8, further comprising storing, responsive to said jump function, said first channel as said first jump location and said second channel as said second jump location.

10. A method according to claim 9, further comprising:
    selecting a third channel within said continuum of channels responsive to said enter function, said third channel becoming said presently-accessed channel; and
    storing, responsive to said enter function, said first channel as said second jump location and said third channel as said first jump location.

11. A method according to claim 8, further comprising:
defining a region of channels within said continuum of channels responsive to selecting said second channel, said region including a plurality of channels, said plurality of channels including said second channel; and
responsive to scrolling to a third channel outside of said plurality of channels of said region using at least one of said channel up function and said channel down function, storing said third channel as said first jump location and said second channel as said second jump location.

12. A method according to claim 11, further comprising defining another region of channels within said continuum of channels responsive to scrolling to said third channel, said another region including another plurality of channels, said another plurality of channels including said third channel.

13. A method according to claim 11, wherein said plurality of channels in said region of channels includes a predetermined number of consecutively-selectable channels.

14. A method according to claim 11, wherein said region includes at least one channel below and at least one channel above said second channel.

15. A remote control having a numeric keypad, an enter button, a jump button and channel up and channel down controls for an audio/video device capable of accessing multiple channels of audio/video media, said remote control comprising:
a microprocessor; and
a computer program loaded in said microprocessor which prevents duplication of the jump button and the channel controls, said computer program operative to
select a first channel within a continuum of selectable channels, said first channel being a presently-accessed channel,
store said first channel as a first jump location,
select a second channel within said continuum of channels responsive to an enter function, said second channel becoming the presently-accessed channel,
store, responsive to said enter function, said first channel as a second jump location and said second channel as said first jump location,
scroll from said second channel to other channels within said continuum of channel responsive to at least one of a channel up function and a channel down function to cause another channel to become the presently-accessed channel, and
responsive to a jump function, jump between said first jump location and said second jump location regardless of the presently-accessed channel.

16. A remote control according to claim 15, wherein said computer program, responsive to said jump function, is operative to store said first channel as said first jump location and store said second channel as said second jump location.

17. A remote control according to claim 16, wherein said computer program is further operative to:
select a third channel within said continuum of channels responsive to said enter function, said third channel becoming said presently-accessed channel; and
responsive to said enter function, store said first channel as said second jump location and store said third channel as said first jump location.

18. A remote control according to claim 15, wherein said computer program is further operative to:
define a region of channels within said continuum of channels responsive to said second channel being selected, said region including a plurality of channels, said plurality of channels including said second channel; and
responsive to scrolling to a third channel outside of said plurality of channels of said region using at least one of said channel up function and said channel down function, store said third channel as said first jump location and store said second channel as said second jump location.

19. A remote control according to claim 18, wherein said computer program is further operative to define another region of channels within said continuum of channels responsive to said third channel being scrolled to, said another region including another plurality of channels, said another plurality of channels including said third channel.

20. A remote control according to claim 18, wherein said plurality of channels in said region of channels includes a predetermined number of consecutively-selectable channels.

21. A remote control according to claim 18, wherein said region includes at least one channel below and at least one channel above said second channel.

22. An improved remote control having a numeric keypad, channel up, channel down, and jump functions for use with audio/video devices capable of receiving multiple channels, the improvement comprising:
means for selecting a first channel within a continuum of selectable channels;
means for selecting a second channel in said continuum of channels, said second channel located a plurality of selectable channels from said, first channel;
means for defining a first region of channels within said continuum of channels, said first region including a first plurality of channels, said first plurality of channels including said first channel;
means for defining a second region of channels within said continuum of channels responsive to said second channel being selected, said second region including a second plurality of channels, said second plurality of channels including said second channel;
means for jumping between said second region of channels and said first region of channels responsive to said jump function; and wherein responsive to said jump function, said means for jumping selects one of said first plurality of channels in said first region when a currently-selected channel is located in said second region; and
responsive to said jump function, said means for jumping selects one of said second plurality of channels in said second region when said currently-selected channel is located in said first region.

23. A method for selecting channels in a receiving capable of receiving multiple channels by remote control, said method comprising the steps of:
selecting a first channel within a continuum of selectable channels;
selecting a second channel in said continuum of channels, said second channel located a plurality of selectable channels from said first channel;
defining a first region of channels within said continuum of channels, said first region including a first plurality of channels and said first channel;
defining a second region of channels within said continuum of channels responsive to said second channel being selected, said second region including a second plurality of channels and said second channel;
jumping between said first region of channels and said second region of channels responsive to said jump function and wherein
when a currently-selected channel is located in said second region, said step of jumping includes jumping to one of said first plurality of channels in said first region; and
when a currently-selected channel is located in said first region, said step of jumping includes jumping to one of said second plurality of channels in said second region.

* * * * *